May 23, 1961 B. E. DOMAGALSKI 2,985,325
ARRANGEMENT FOR THE CHANGING OF MOVABLE
PARTS CARRIED BY VEHICLES

Filed Nov. 26, 1957 3 Sheets-Sheet 2

Bernard Edward Domagalski
by [signature] atty.

May 23, 1961  B. E. DOMAGALSKI  2,985,325
ARRANGEMENT FOR THE CHANGING OF MOVABLE
PARTS CARRIED BY VEHICLES
Filed Nov. 26, 1957  3 Sheets-Sheet 3
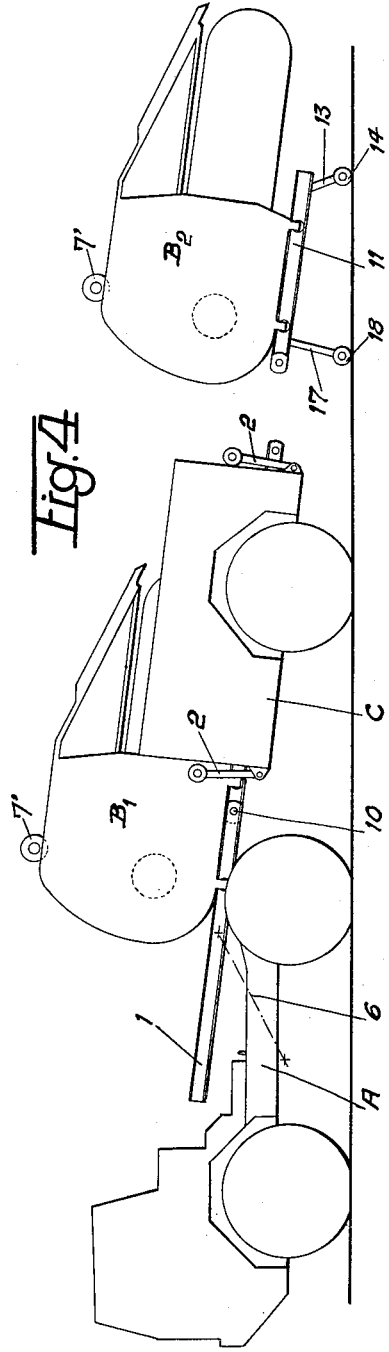
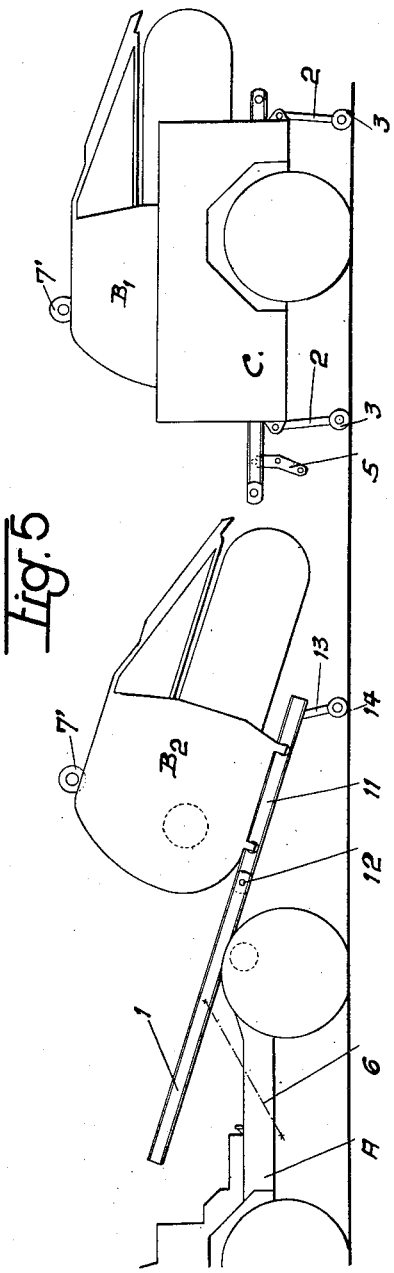
Barnard Edouard Domidgalski
by A.H.Golden United States Patent Office 2,985,325
Patented May 23, 1961

2,985,325
ARRANGEMENT FOR THE CHANGING OF MOVABLE PARTS CARRIED BY VEHICLES

Bernard Edouard Domagalski, Vanves, France, assignor to Societe Anonyme dite: Etablissements Matenin, Paris, France, a company of France Filed Nov. 26, 1957, Ser. No. 699,119

Claims priority, application France Jan. 18, 1957

3 Claims. (Cl. 214—38)

The present invention has for its object an arrangement for the rapid change in situ of removable mechanical parts carried by a vehicle and their substitution by spare parts trailed by said vehicle.

Such an arrangement is more particularly applicable, although not exclusively, to trench digging machines or excavators adapted to provide a continuous operation through bucket ladders carried by said machines which are generally self-propelling and operate through a rotary movement as each bucket engages the ground.

Now, it may be necessary to change the whole bucket ladder in accordance with the requirements of different digging operations to be performed, as may be necessary, either as a consequence of wear or else for replacing a given bucket ladder by another bucket ladder adapted to dig broader or narrower trenches. This change of bucket ladder requires generally a comparatively long operation and a difficult handling by reason of the weight and size of the bucket ladders and it is necessary to resort for this purpose to handling apparatus which are not carried with the digging machine. Therefore, it is necessary to proceed with this change of bucket ladder at the works and not in situ, which leads to losses of time and to extra expenses.

My invention has for its object to remove these drawbacks chiefly in the case of excavators or digging machines with a view to changing rapidly the bucket ladder on any yard, without resorting to handling apparatus independent of the excavator to be considered.

It is obviously not limited to such an application. The arrangement forming the object of my invention includes chiefly a trailer coupled with a vehicle such as an excavator and carrying a mechanical spare part, such as a spare bucket ladder together with a trestle carried by said trailer and adapted to be coupled in its turn with the trailer, so as to receive the spare part to be removed from the trailer and to be disconnected from the latter, while the mechanical part to be changed on the vehicle is transferred onto the trailer which latter is then disconnected and the trestle is now coupled with the vehicle, instead of the trailer, so that the spare part carried by it may be transferred onto the vehicle with reference to which the now empty trestle is finally disconnected.

Suitable props provide for the supporting at the desired moment of the front and/or of the rear end of the trailer and of the trestle.

Suitable control means such as winches, jacks or the like incorporated with the equipment of the excavator, allow aligning at the desired moment the rails or the like runways or slideways forming part of the frame carrying the mechanical part to be changed on the vehicle, of the trailer carrying the spare part and of the trestle, so as to allow, through a suitable arrangement of the attaching points and members adapted to interconnect the trestle, the trailer and the vehicle, a transfer of the spare part onto the trestle, of the part to be changed carried by the vehicle onto the trailer and of the spare part onto the vehicle.

The accompanying drawings illustrate by way of example and by no means in a limiting sense a preferred embodiment of the object of my invention. In said drawings:

Fig. 4 illustrates again the same arrangement during the transfer of the bucket ladder from the excavator onto the trailer.

Fig. 5 illustrates the same arrangement during the fitting of the spare bucket ladder on the excavator.

Turning to the drawings, A designates the self-propelling chassis of a trench digger or excavator, carrying on a frame 1 a bucket ladder B1 with its support folded down horizontally into road position, said excavator drawing along a trailer C carrying a spare bucket ladder D2.

Figure 1:
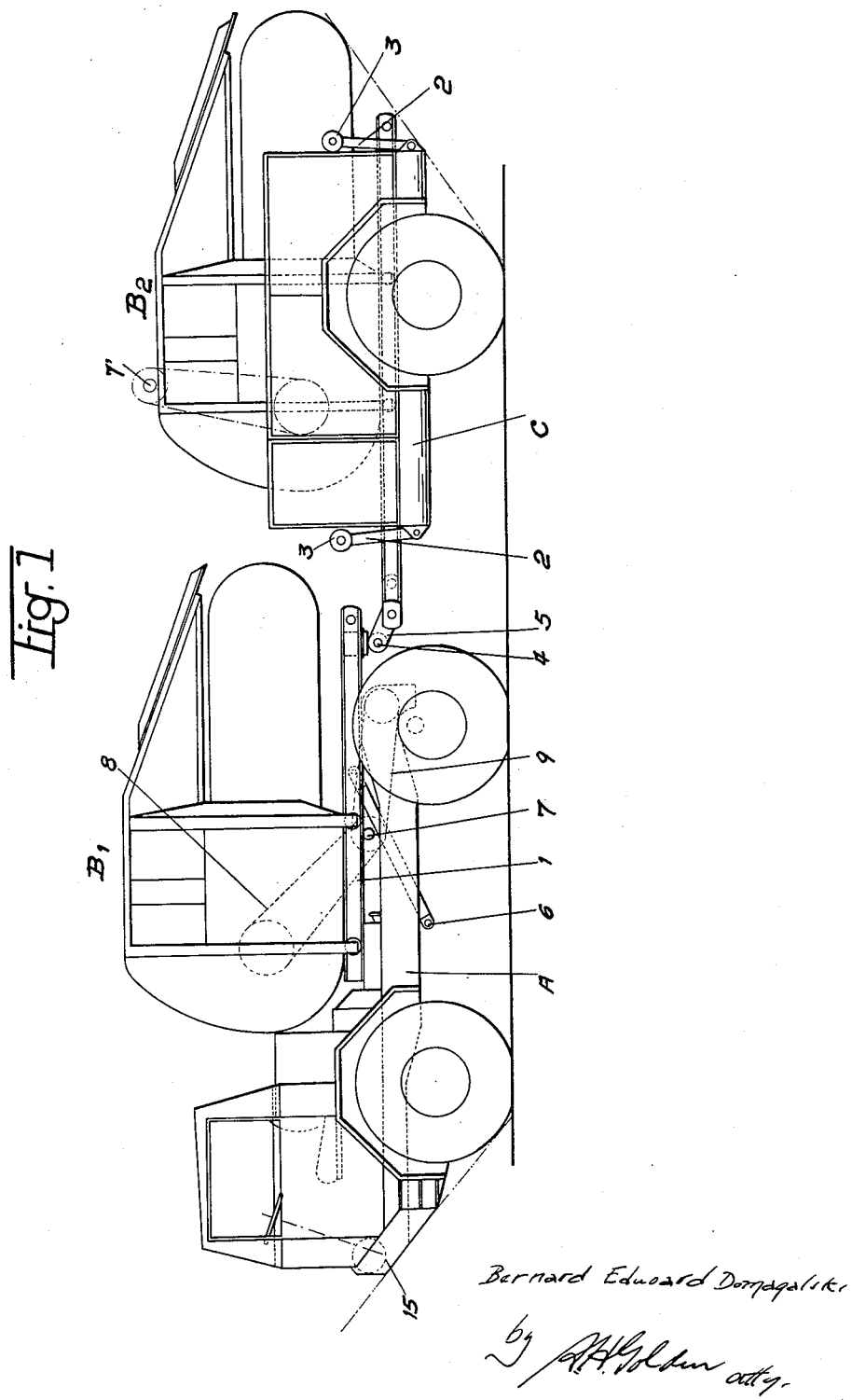
Fig. 1 illustrates an excavator as ready to progress over a road with its bucket ladder folded back into a horizontal position and a spare bucket ladder carried by a trailer drawn by the excavator.

The trailer C carries at either end pivoting arms 2 provided at their upper ends with rollers 3, said arms standing normally in their raised position for progression over a road (Fig. 1).

The excavator chassis A and its trailer C being positioned on the working site with a view to replacing the bucket ladder B1 by the bucket ladder B2, the arms 2 on the trailer are first turned down to form props holding the trailer C at both ends without any possibility of tilting.

Figure 2:
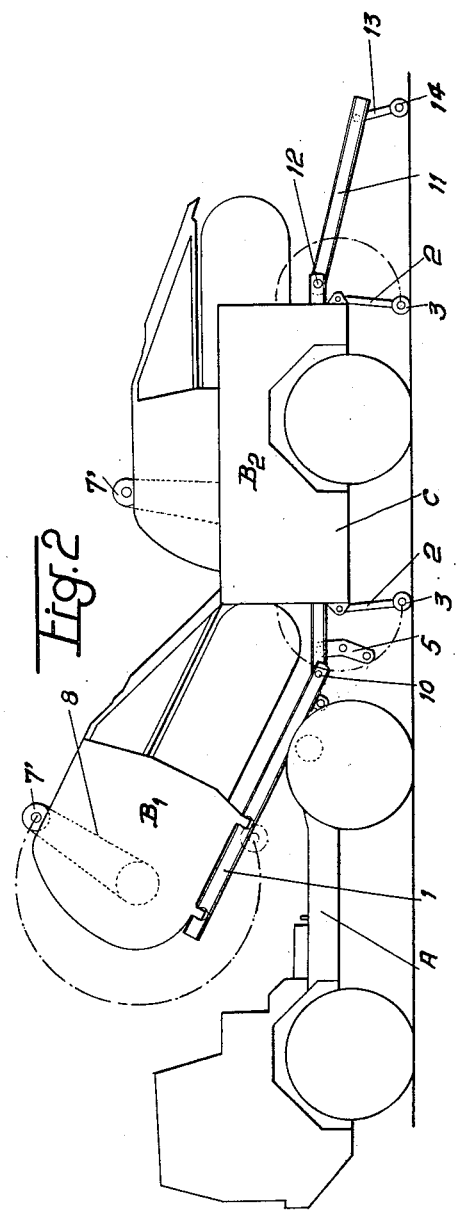
Fig. 2 illustrates the same arrangement when positioned for executing the transfer in situ of the spare bucket ladder.

This being done, the transverse spindle or spindles 4 connecting the links 5 on the trailer with the frame 1 on the excavator are removed; said links drop freely and become free during the following operations (Fig. 2).

The jacks 6 (Fig. 1) are then operated so as to raise the frame 1 carrying the bucket ladder B1 after disconnecting the transverse spindle 7 pivotally connecting the chain transmissions 8 and 9 controlling the bucket ladder; said spindle 7 enters then its upper position 7' illustrated in Fig. 2.

The front of the trailer C is then connected with the lower end of the frame 1, one or more transverse spindles 10 being inserted for this purpose near the locations precedingly occupied by the spindle or spindles 4 (Fig. 2).

To the rear of the trailer C is then coupled a trestle 11 which was precedingly carried by said trailer C to which said trestle is now connected by one or more transverse spindles 12 (Fig. 2); arms 13 pivotally secured to the trestle and carrying at their outer ends rollers 14 are lowered into the position illustrated in Fig. 2 so as to form props for the trestle in its operative position.

Figure 3:
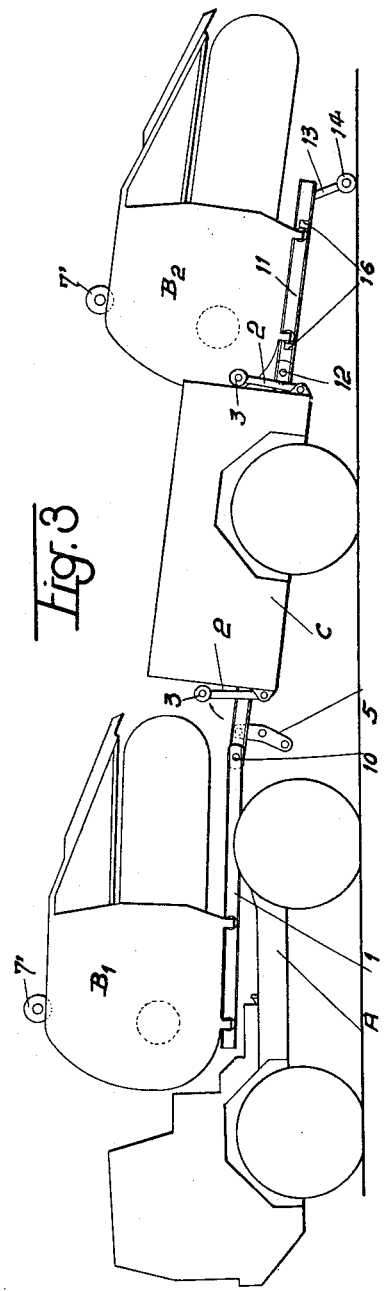
Fig. 3 illustrates the same arrangement with the spare bucket ladder transferred onto an auxiliary support or trestle.

The transfer of the bucket ladder B2 serving as a spare is then shifted from the trailer onto the trestle 11 and to this end the arms 2 ending with the rollers 3 on the trailer C are shifted into their upper position illustrated in Fig. 3. This being done, the jacks 6 are operated and the frame 1 is rocked in a manner such that the longitudinal rails which are not illustrated and which are carried by the floor of the trailer C are aligned with the corresponding rails carried by the trestle 11 as shown in Fig. 3.

The winch 15 positioned at the front end of the excavator A is then actuated so that its cable provides for the sliding of the spare bucket ladder B2 onto the trestle 11 (Fig. 3) on which it is then held fast through the agency of the wedges 16.

The spindles 12 are then removed (Fig. 4) after the arms 17 provided with rollers 18 and arranged to the front of the trestle 11 have been lowered to form props. The trestle 11 is thus released with reference to the trailer C. It carries now the spare bucket ladder B2 while the trailer C remains coupled with the excavator A carrying the bucket ladder B1.

The jacks 6 are now actuated again so as to make the frame 1 of the bucket chain B1 rock, so that the rails carried by it may now lie in alignment with the rails on the trailer C (Fig. 4).

The bucket ladder B1 is then disconnected with reference to the raising cables or chains and the bucket ladder is allowed to slide onto the trailer C through the agency of the cable wound over the winch 15. The bucket ladder B1 is secured to the trailer C through the agency of suitable wedges when said bucket ladder has entered its final position on the trailer.

The trailer is then returned into its horizontal position by a rocking of the frame 1 through the agency of the jacks 6; the arms 2 carrying rollers 3 and provided on the trailer C are lowered and the spindle or spindles 10 are removed, so as to release the trailer C with reference to excavator A.

The excavator A is then brought into registry with the trestle 11 carrying the spare bucket ladder B2. The frame 1 is rocked through operation of the jacks 6 so as to bring the opening or openings precedingly carrying the spindle or spindles 12 into registry with the opening or openings through which the spindle or spindles 10 were precedingly introduced. The spindle or spindles 12 are repositioned inside last-mentioned openings (Fig. 5) so as to couple the frame 1 with the trestle 11.

The jacks 6 are again operated so as to set the rails on the frame 1 into alignment with the rails on the trestle 11 after raising the front arms 17 on the trestle 11.

The spare bucket ladder B2 carried by the trestle is then hauled onto the excavator A by the cable of the winch 15.

The raising cable chains for the bucket ladder B2 on the frame 1 are then operatively connected. The spindle or spindles 12 connecting the excavator with the trestle 11 which is thus separated from the excavator are removed after lowering again the front props or arms 17 of the trestle.

The jacks 6 are actuated for raising the bucket ladder B2 and the spindle 7 which serves as a pivotal connection for the chain transmission 8—9 controlling the bucket ladder is set again in its normal lower position as shown in Fig. 1.

The excavator A is now ready to operate with the spare bucket ladder B2.

The same operations are repeated each time it is desired to change the bucket ladder without any further handling means or implementing being required.

What I claim is:

1. In a combination of the class described, a wheeled vehicle having a power source, a wheeled trailer pulled by said vehicle, a wheeled support carried by said vehicle and trailer, said vehicle, said trailer and said wheeled support each having a machine mounting and guiding portion, a pair of duplicate machines constructed for sliding coaction with said mounting and guiding portions of said vehicle, said trailer and said support, means initially mounting the first of said duplicate machines on said mounting and guiding portions of said wheeled vehicle in operative engagement with the power source of said vehicle so as to render said machine effective, means whereby the second of said machines is carried on said trailer mounting and guiding portion whereby both machines together with said support are transported by said vehicle and trailer to the place where said first machine is effective to perform its function through actuation from said power source, means for placing said support with said mounting and guiding portion in alignment with the mounting and guiding portion of the trailer whereupon the second of said machines is slidable off the trailer mounting and guiding portion and on to the support mounting and guiding portion, the alignment of said vehicle and trailer allowing movement of the first machine onto the trailer after the separation of said first machine from said power source, and the movement and alignment of said wheeled support thereafter with the vehicle allowing the sliding of the second machine from the mounting and guiding portion of said wheeled support onto the vehicle mounting and guiding portion for connection with said power source whereupon said second machine is rendered effective as a replacement for said first machine.

2. In a combination of the class described, a wheeled vehicle having a power source, a wheeled trailer pulled by said vehicle, a wheeled support carried by said vehicle and trailer, said vehicle, said trailer and said wheeled support each having a mounting and guiding portion for a machine, a pair of earth digging machines constructed for sliding coaction with the mounting and guiding portions of said vehicle, said trailer and said support, means initialy mounting the first of said machines on mounting and guiding portion of said wheeled vehicle in operative engagement with the power source of said vehicle so as to render said machine effective as a powered digging tool, means whereby the second of said machines is carried on said trailer mounting and guiding portion, whereby both machines together with said support are transported by said vehicle and trailer to the place where said first machine is effective to perform its function through actuation from said power source, means for placing said wheeled support in separated alignment with the mounting and guiding portion of the trailer whereupon the second of said machines is slidable off the trailer and on to the support, the alignment of said vehicle and trailer than allowing movement of the first machine onto the trailer after the separation of said first machine from said power source, and the movement and alignment of said support thereafter with the vehicle allowing the sliding of the second machine onto the vehicle mounting and guiding portion for connection with said power source whereupon said second machine is rendered effective as a replacement for said first machine.

3. In a combination of the class described, a wheeled vehicle having a power source and a machine mounting and guiding portion, a machine slidably mounted on said machine mounting and guiding portion, means connecting said machine to said power source whereby said machine is operable while on said vehicle in all locations to which said vehicle is moved, a trailer having a machine mounting and guiding portion adapted for alignment with the machine mounting and guiding portion of said vehicle, a second machine slidably mounted on said machine mounting and guiding portion of said trailer, a machine support carried by said trailer and vehicle and having also a machine mounting and guiding portion, means securing said support in aligned relation to the machine mounting and guiding portion of said trailer and also the machine mounting and guiding portion of said vehicle, whereby the machine mounting and guiding portions of said vehicle, said trailer and said wheeled support are adapted for endwise alignment by rearrangement of said vehicle through the securing of said support to the wheeled vehicle in one arrangement and to the trailer in a second arrangement, so that the said second machine and said first machine can slide from one mounting and guiding portion to the other for transport and exchange, and said second machine having means adapted for connection with the power source of said vehicle whereby said second machine is rendered effective as a replacement for said first machine.

References Cited in the file of this patent

UNITED STATES PATENTS

| | | |
|---|---|---|
| 1,835,133 | Bergen | Dec. 8, 1931 |
| 2,494,735 | Ambarcumian | Jan. 17, 1950 |
| 2,588,001 | Holland | Mar. 4, 1952 |
| 2,646,178 | Alvare | July 21, 1953 |

FOREIGN PATENTS

| | | |
|---|---|---|
| 291,080 | Switzerland | Sept. 1, 1953 |
| 826,728 | Germany | Jan. 3, 1952 |